(12) United States Patent
Kim

(10) Patent No.: US 8,327,496 B2
(45) Date of Patent: Dec. 11, 2012

(54) WIPER BLADE WITH HEATING ELEMENTS

(75) Inventor: In Kyu Kim, Ansan-si (KR)

(73) Assignees: ADM21 Co., Ltd. (KR); In Kyu Kim (KR)

( * ) Notice: Subject to any disclaimer, the term of this patent is extended or adjusted under 35 U.S.C. 154(b) by 671 days.

(21) Appl. No.: 12/100,005

(22) Filed: Apr. 9, 2008

(65) Prior Publication Data

US 2009/0100626 A1    Apr. 23, 2009

(30) Foreign Application Priority Data

Oct. 17, 2007   (KR) .................. 10-2007-0104420
Jan. 18, 2008   (KR) .................. 10-2008-0005867

(51) Int. Cl.
*G05B 5/00*       (2006.01)
*B60S 1/38*       (2006.01)

(52) U.S. Cl. ............... 15/250.07; 15/250.05; 15/250.43; 15/250.201; 219/520; 219/522; 219/202

(58) Field of Classification Search ............... 15/250.05, 15/250.06, 250.07, 250.201, 250.43, 250.361; 219/202, 203, 520, 521, 522, 542, 543, 544, 219/545, 546, 547, 548
See application file for complete search history.

(56) References Cited

U.S. PATENT DOCUMENTS

| | | | | |
|---|---|---|---|---|
| 2,596,063 | A |   | 5/1952  | Anderson |
| 3,249,959 | A | * | 5/1966  | Theckston ............ 15/250.06 |
| 3,530,525 | A | * | 9/1970  | Abel .................... 15/250.07 |
| 4,845,344 | A | * | 7/1989  | Price et al. ................ 219/547 |
| 5,497,528 | A |   | 3/1996  | Wu |
| 5,520,453 | A | * | 5/1996  | Aoki et al. ................ 312/406 |
| 5,649,337 | A | * | 7/1997  | Lobner ................ 15/250.06 |
| 5,826,293 | A | * | 10/1998 | Holland ................ 15/250.06 |
| 6,028,291 | A | * | 2/2000  | Heisler .................... 219/203 |
| 6,100,499 | A | * | 8/2000  | Davila, Sr. ............ 219/202 |
| 6,591,443 | B1 | * | 7/2003 | Gilpin .................... 15/250.06 |
| 6,678,915 | B1 | * | 1/2004 | Ravenell ................ 15/250.07 |
| 6,936,985 | B2 |   | 8/2005 | Pankey et al. ............ 318/443 |
| 7,693,630 | B1 | * | 4/2010 | Mitchell ................ 701/36 |
| 7,721,382 | B2 | * | 5/2010 | Malone ................ 15/250.07 |
| 2008/0178408 | A1 | * | 7/2008 | King ................ 15/250.06 |

FOREIGN PATENT DOCUMENTS

| | | |
|---|---|---|
| CN | 2246600 Y  | 2/1997 |
| DE | 4224866 A1 | 2/1994 |

\* cited by examiner

*Primary Examiner* — Gary Graham
*Assistant Examiner* — Michael Jennings
(74) *Attorney, Agent, or Firm* — Seed IP Law Group PLLC

(57) ABSTRACT

A wiper blade is provided capable of wiping a windshield of a vehicle in a suitable operating condition even in a cold winter season. The wiper blade includes a wiper strip configured to contact and wipe a glass surface of the windshield, a frame coupled to the wiper strip, an adapter disposed at a center of the frame and configured to be joined to the wiper arm, and a heating unit attached to the frame to heat the wiper blade. The heating unit includes a power source and a heating element heated by power supplied from the power source.

17 Claims, 2 Drawing Sheets

Fig. 1 *(Prior Art)*
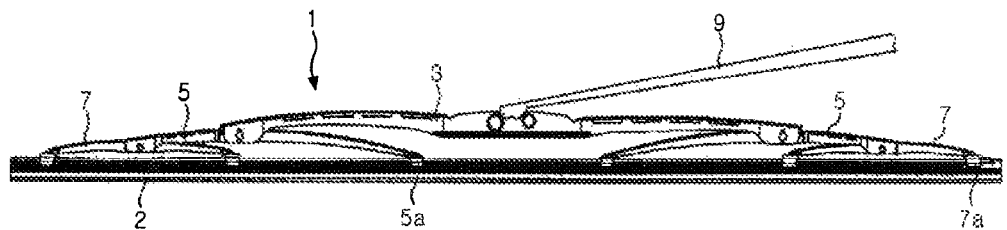
Fig. 2
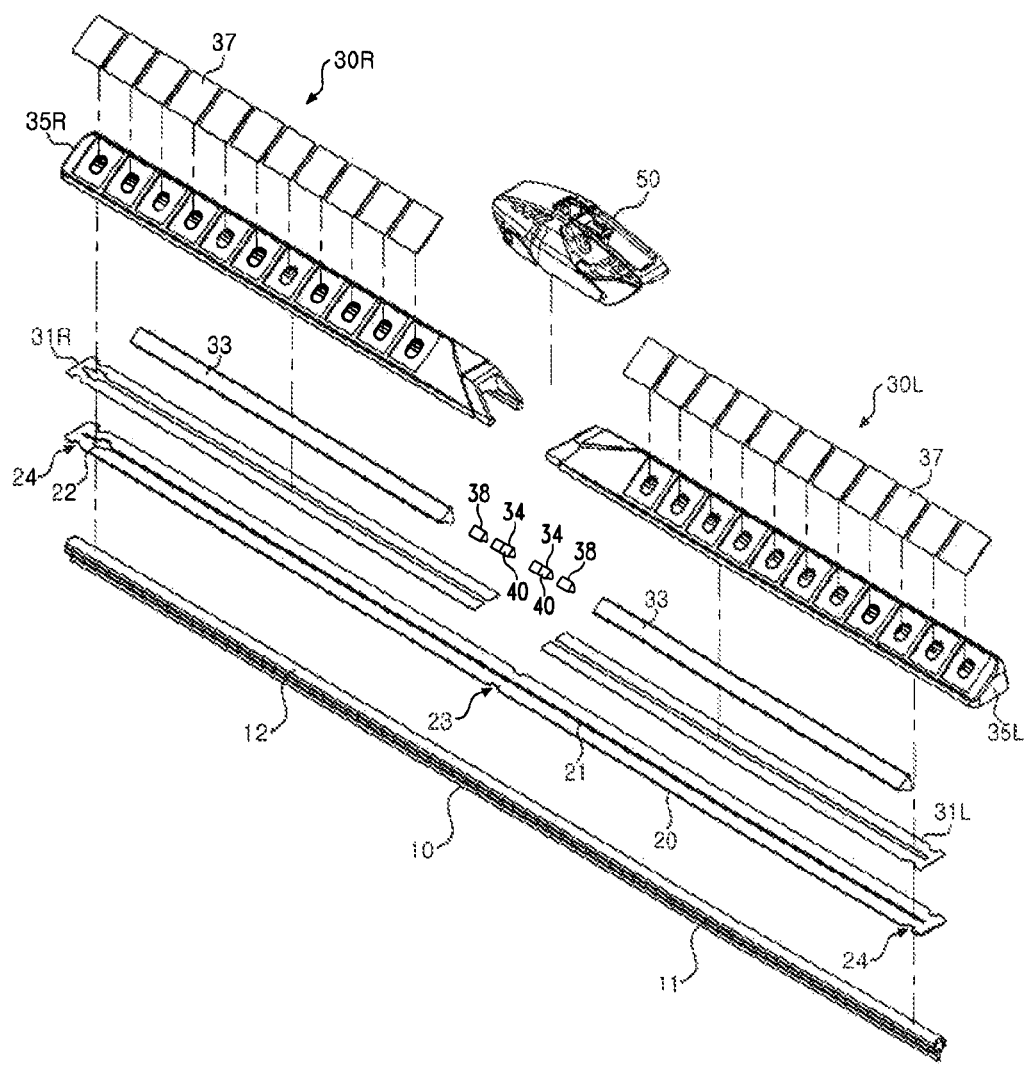

WIPER BLADE WITH HEATING ELEMENTS

BACKGROUND

1. Technical Field

The present invention relates to a wiper blade configured to be coupled to a wiper device for wiping a windscreen of vehicles, and more particularly to a wiper blade that includes heating elements to allow the wiper blade to wipe a windshield of a vehicle in a suitable operating condition even in a cold winter season.

2. Description of the Related Art

Referring to FIG. 1, a conventional wiper device includes a wiper arm 9 pivoted in right and left directions by a motor (not shown) disposed in a vehicle, and a wiper blade 1 coupled to the wiper arm 9 to move along with the wiper arm 9. The wiper blade 1 is provided with a wiper strip 2 that wipes a glass surface of a windshield (not shown) of the vehicle while reciprocally moving across the windshield in a closely contacting state.

The wiper blade 1 is coupled to the wiper arm 9 and is pivoted at a predetermined angle by operation of the motor. Conventionally, the wiper blade 1 includes a first link member 3 joined to the wiper arm 9, a plurality of second link members 5 joined to the first link member 3 to evenly deliver pressure of the wiper arm 9, and a plurality of third link members 7 respectively joined to the second link members 5 to connect the second link members 5 to the wiper strip 2.

Such conventional wiper blades comprising plural link members are disclosed in U.S. Pat. Nos. 2,596,063 and 5,497,528, DE No. 4,224,866, etc.

Clips 5a and 7a are provided to distal ends of the second and third link members 5 and 7 disposed near the wiper strip 2, and are fitted into a rail groove of the wiper strip 2 to join the wiper strip 2 to the second and third link members 5 and 7, respectively.

The conventional wiper blade 1 includes the plural link members 3, 5 and 7, which are coupled to one another to pivot at predetermined angles, so that the wiper strip 2 made of rubber can be flexibly rounded along the contour of the windshield.

However, the wiper strip 2 tends to contract and become rigidly hardened in a cold winter season. Upon loss of flexibility, the wiper strip 2 does not come into close contact with the windshield surface. Particularly, both ends of the wiper strip 2 are slightly separated from the windshield surface, which causes a reduction in contact area between the wiper strip and the windshield surface.

BRIEF SUMMARY

Embodiments of the present invention are provided to solve the problems of the conventional techniques as described above, and an aspect of the present invention is to provide a wiper blade that includes heating elements to allow the wiper blade to wipe a windshield in a suitable operating condition even in a cold winter season.

In accordance with one embodiment, the above and other objects can be accomplished by the provision of a wiper blade coupled to a wiper arm of a vehicle to wipe a glass surface of a windshield, including: a wiper strip contacting the glass surface to wipe the glass surface; a frame coupled to the wiper strip; an adapter disposed at a center of the frame and joined to the wiper arm; and a heating unit attached to the frame to heat the wiper blade, wherein the heating unit comprises a power source and a heating element heated by power supplied from the power source.

In one aspect, the wiper blade includes a pair of the heating units respectively coupled to right and left sides of the frame and operating independently.

In one aspect, the power source is at least one solar cell generating electricity by means of sunlight.

In one aspect, the heating element is a heating film formed by wrapping a NiCr or Kantal heating wire with a polyimide or polyethylene terephthalate (PET) film.

In one aspect, the heating unit includes a battery for storage of power to be supplied to the heating element.

In one aspect, the wiper blade includes a cover member coupled to the frame to protect the power source and the heating element.

In one aspect, the cover member has a slanted surface to serve as a spoiler capable of preventing the wiper blade from being detached from the glass surface of the windshield when the vehicle is driven at high speed.

In one aspect, the heating unit including the power source, the heating element, and the battery is constituted as a single heating module.

In one aspect, the heating unit comprising the power source, the heating element, the battery, and the cover member is constituted as a single heating module.

In one aspect, the heating element is a heating wire printed on an iron plate constituting the frame by silk-screen printing to be integrally formed with the frame when manufacturing the frame.

In one aspect, the heating element is separately prepared in the form of a heating film and attached to an upper surface of the frame.

In one aspect, the wiper blade further includes a temperature sensor detecting a temperature of the wiper blade and a controller operating the heating element based on the temperature detected by the temperature sensor.

In one aspect, the controller is automatically operated based on the temperature detected by the temperature sensor or manually operated by a vehicle driver.

In accordance with another embodiment, a wiper blade coupled to a wiper arm of a vehicle to wipe a glass surface of a windshield includes: a heating element heating the wiper blade; and a power source supplying power to the heating element.

In one aspect, the wiper blade further includes right and left spoilers permitting the wiper blade to be brought into close contact with the glass surface when the vehicle travels, the heating element and the power source being disposed inside the right and left spoilers.

In one aspect, the power source is a rechargeable battery.

In one aspect, the wiper blade further includes a solar cell generating electricity by means of sunlight, wherein the rechargeable battery is recharged by electricity generated from the solar cell.

BRIEF DESCRIPTION OF THE SEVERAL VIEWS OF THE DRAWINGS

The above and other objects, features and advantages of embodiments of the present invention will become apparent from the following description of preferred embodiments given in conjunction with the accompanying drawings, in which:

FIG. 1 is a front view of a conventional wiper blade;

FIG. 2 is an exploded perspective view of a wiper blade according to one embodiment;

DETAILED DESCRIPTION

Some embodiments of the present invention will be described in detail with reference to the accompanying drawings hereinafter.

Figure 3:
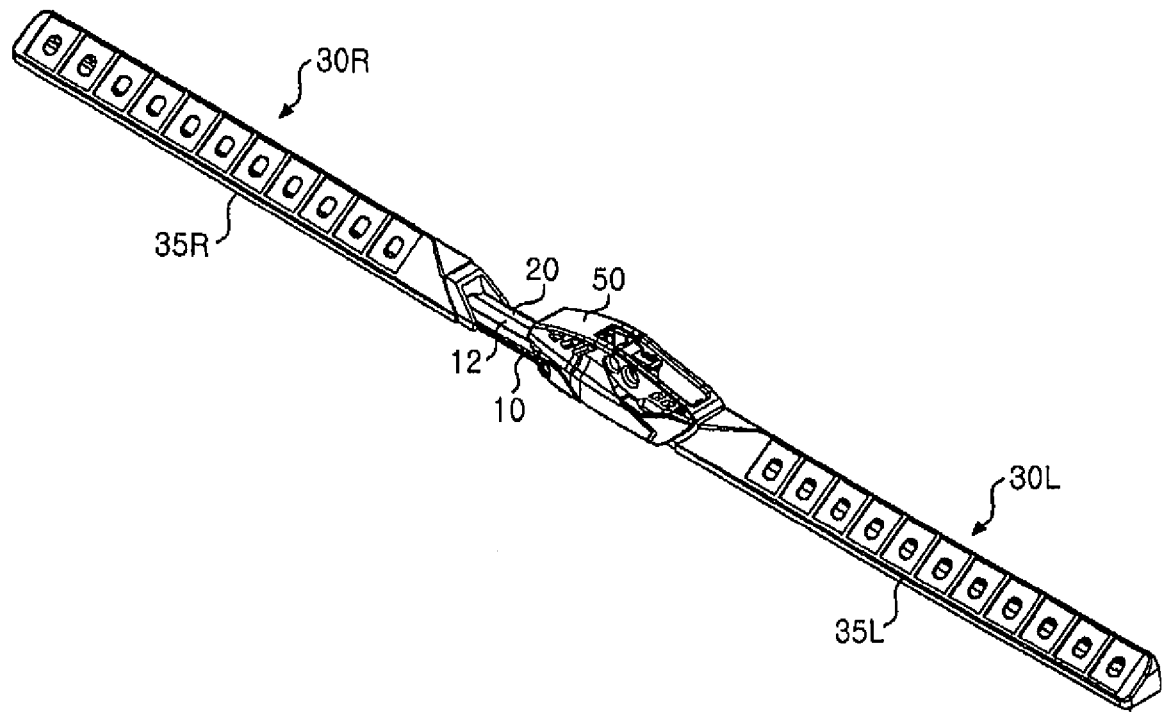
FIG. 3 is a perspective view of the wiper blade according to the embodiment of FIG. 2.
Figure 4:
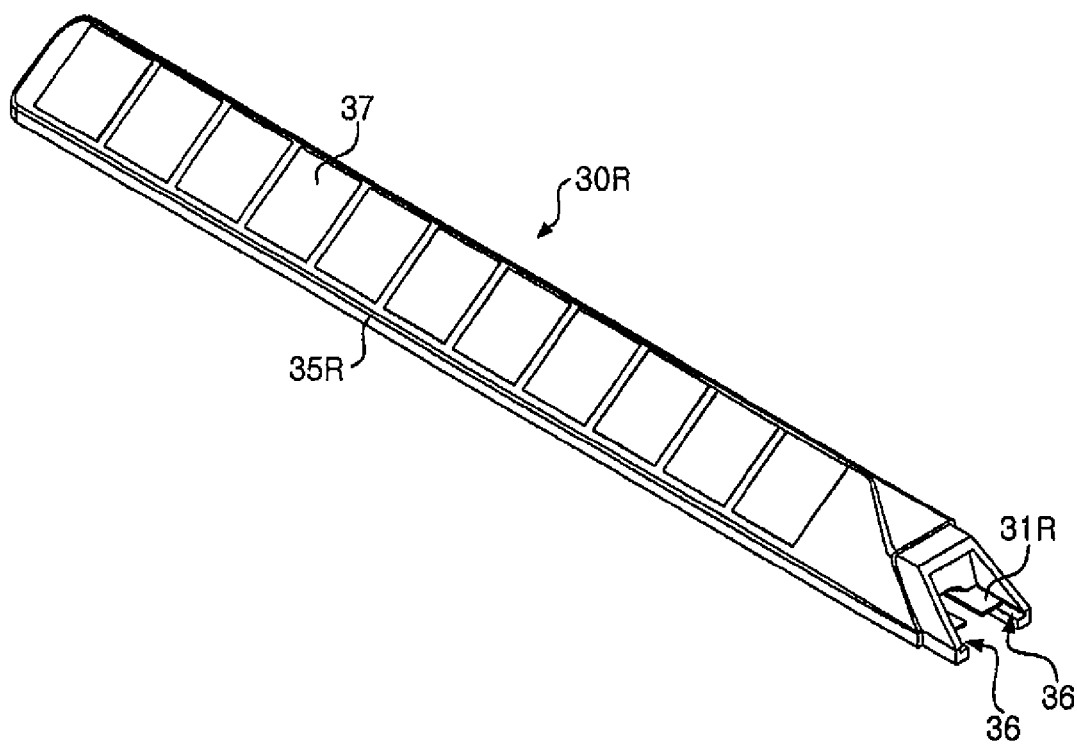
FIG. 4 is a perspective view of a portion of a heating unit of the wiper blade according to another embodiment.

FIG. 2 is an exploded perspective view of a wiper blade according to one embodiment, and FIG. 3 is a perspective view of the wiper blade according to one embodiment. FIG. 4 is a perspective view of a heating unit of the wiper blade according to another embodiment.

Referring to FIGS. 2 and 3, a wiper blade according to one embodiment includes a wiper strip 10 contacting a glass surface of a vehicle windshield to wipe the glass surface while pivoting on the glass surface, a frame 20 coupled to the wiper strip 10, and heating units 30R, 30L coupled to the frame 20 to heat the wiper blade, and an adapter 50 disposed at the center of the frame 20 to connect the wiper blade to a wiper arm (not shown).

As such, according to embodiments of the present invention, since the wiper blade can be manufactured by assembling the respective components without separate post processing, costs and efforts in manufacture of the wiper blade can be reduced, thereby improving productivity.

In FIGS. 2 to 4, the components of the wiper blade including the wiper strip 10, the frame 20, and the heating units 30R and 30L are shown as having linear shapes for illustrative convenience, but these components can be formed in slightly curved or any other shapes so as to closely contact a glass surface in practice.

The wiper strip 10 may have the same configuration as that of the conventional wiper strip 2 shown in FIG. 1, or any other suitable wiper strip configuration, and includes a pair of right and left rail grooves 11 that are formed along the wiper strip 10 in the longitudinal direction, as shown in FIG. 2.

The wiper strip 10 can include an elongated reinforcing iron core (not shown) inserted into each of the rail grooves to maintain the shape of the wiper strip 10 made of rubber while ensuring coupling to plural link members such as the link members 3, 5 and 7 of FIG. 1. However, since the frame 20 can provide functions of the link members 3, 5 and 7 (FIG. 1) and the reinforcing iron cores of the conventional wiper blade 1 (FIG. 1), the reinforcing iron core of the conventional wiper blade 1 is not required for the wiper blade of at least some embodiments of the present invention.

The frame 20 presses the wiper strip 10 against the glass surface of the windshield at a constant resilient force such that the wiper strip 10 can be brought into close contact with the glass surface. For this purpose, the frame 20 can be made of an elongated metal plate and has a curved shape.

As shown in FIG. 2, the frame 20 can be formed with a slit 21 in the longitudinal direction. The wiper strip 10 can be mounted on the frame 20 by inserting the rail grooves 11 of the wiper strip 10 into the slit 21.

The slit 21 can be formed at one end thereof with an insertion hole 22, through which an upper end 12 of the wiper strip 10 passes to permit the rail grooves 11 of the wiper strip 21 to be inserted into the slit 21.

The frame 20 may have a single slit 21 and a single insertion hole 22, as shown in FIG. 2. Alternatively, although not shown in the figures, the frame 20 may have two or more insertion slits 21 along with two or more insertion holes 22 for easy coupling of the wiper strip 10. On the other hand, the upper end 12 of the wiper strip 10 is shaped corresponding to the number of slits 21 and insertion holes 22. For example, as shown in FIG. 2, when the frame 20 includes the single slit 21 and the single insertion hole 22, the upper end 12 of the wiper strip 10 constitutes a single flat surface in the longitudinal direction without being divided into two sections.

The frame 20 has a pair of first depressions 23 formed on an outer periphery at the center of the frame 20 to maintain coupling between the frame 20 and the adapter 50, and a pair of second depressions 24 formed on an outer periphery at opposite sides of the frame 20 to maintain coupling between the frame 20 and cover members 35R and 35L of the heating units as described below.

According to one embodiment, the heating unit 30R, 30L includes a heating film 31R, 31L as a heating element, a battery 33 for storage of power to be supplied to the heating film 31R, 31L, the cover member 35R, 35L coupled to the frame 20 to protect the heating film 31R, 31L and the battery 33, and a solar cell 37 attached to a surface, such as an outer surface, of the cover member 35R, 35L for generating electricity by means of sunlight to charge the battery 33. Alternatively the solar cells can be attached to an inner surface of the cover member 35R, 35L and be exposed to an external environment along at least a portion thereof through apertures or openings formed in the cover member 35R, 35L.

The heating units 30R and 30L may be coupled to right and left sides of the frame 20. In other words, since the right and left heating units 30R and 30L are independent of each other, they are independently assembled to or disassembled from the wiper blade and have independent internal wirings.

As such, since the heating units 30R and 30L are independently charged, supplied with power, and heat the wiper blade, it is possible to prevent the wiper blade from being entirely stopped due to malfunction or short of one of the heating units. Furthermore, since the respective heating units are easily assembled to or dissembled from the wiper blade, repair and replacement of components can be efficiently performed.

The heating film 31R, 31L is formed by wrapping a NiCr or Kantal heating wire with a polyimide or polyethylene terephthalate (PET) film, and serves as a heating element that generates heat with power supplied from an external power source such as a battery or solar cell.

The heating film 31R, 31L is preferably disposed on the frame 20 to contact an upper surface of the frame 20 and has a shape corresponding to the frame 20 so as not to obstruct coupling between the wiper strip 10 or the cover member 35R, 35L and the frame 20.

As shown in FIG. 2, preferably, the heating films 31R and 31L are configured to be disposed on the right and left sides of the frame 20, respectively, such that two heating films 31R and 31L are provided to a single frame 20. In this regard, if the heating films 31R and 31L are provided as a single component instead of independent components, the adapter 50 tends to press the heating films 31R and 31L when coupled to the central region of the frame 20, which may result in short circuits and overheating. On the other hand, when the two heating films 31R and 31L are provided to the single frame as described above, it is desirable in that separation, assembling, and replacement of the heating films 31R and 31L can be easily performed, and in that, if one of the heating films 31R and 31L malfunctions, the other heating film can operate normally. However, a single component heating film is contemplated to fall within the scope of the present disclosure and the claims that follow. For example, in other embodiments, a one-piece heating film can be incorporated which is mutually shaped with an adaptor toward the central portion of the wiper blade to prevent short circuits and overheating.

In addition, as shown in FIG. 4, each of the heating films 31R and 31L may constitute a single module along with the battery 33, the cover member 35R, 35L, and the solar cell 37. In this manner, when each of the heating films 31R and 31L are constituted as the single module, a typical wiper blade can be modified to serve as a heat generating wiper blade merely by mounting the heating units 30R and 30L to a frame of the typical wiper blade, and, if any one of the heating films 31R and 31L malfunctions, it can be easily replaced with a new one.

Further, the heating wires included in the heating films 31R and 31L may be integrated into the frame 20 by silk-screen printing and the like on a plate, such as an iron plate which constitutes the frame 20 during a process of manufacturing the frame 20. Since the frame 20 is made of the iron plate, the frame 20 is painted to prevent corrosion. The heating wires are provided to the iron plate before or after painting the iron plate.

Moreover, the respective heating films 31R and 31L may be prepared separately and then attached to the upper surface of the frame 20 by means of double-sided tapes, adhesives or gluing agents.

The heating films 31R and 31L can be supplied with power not only from the battery 33, but also from the solar cell 37.

In one aspect, the battery 33 is a lithium dry cell that is charged by the solar cell 37. It is desirable that a diode (not shown) be disposed between the battery 33 and the solar cell 37 to prevent reverse voltage.

The battery 33 may be installed inside the cover member 35R, 35L along with a controller 34. The number of batteries 33 can be changed according to design requirements, and the shape of the battery 33 is not particularly limited to that shown in the drawings.

When the service life of the battery 33 ends, the battery 33 is preferably separated from the cover member 35R, 35L and replaced with a new one.

When the wiper blade is provided with the controller 34, the controller 34 turns on or off the heating film 31R, 31L depending on a temperature detected by a temperature sensor 38. At this time, a reference temperature for turning on the heating film 31R, 31L is preferably set to a temperature at which performance of the wiper strip 10 deteriorates significantly. Further, preferably, when the temperature of the heating film 31R, 31L increases and reaches a target temperature or when a predetermined time period lapses after the increase in temperature of the heating film 31R, 31L, the controller 34 stops heat generation of the heating film 31R, 31L to save energy.

As described above, when the battery 33 is charged by means of the solar cell 37 and heat is generated from the heating films 31R and 31L, the battery 33 can output a power of about 0.5~5 W, which enables the heating films 31R and 31L to be maintained at a temperature of 20~80° C.

The controller 34 can be operated whether or not the vehicle is on. If needed, the controller or the heating films 31R and 31L can be manually operated after separating the cover members, or can be automatically operated by a vehicle driver.

Additionally, or alternatively, the controller 34 can include a vibration sensor 40 to detect vibration generated when driving a motor of the vehicle and thereby turns on or off the heating films 31R and 31L based on the vibration. Here, a reference or threshold temperature for turning on the heating films 31R and 31L can be set to a temperature at which performance of the wiper strip 10 deteriorates significantly. In one aspect, when any one of the heating films 31R and 31L has a temperature exceeding the reference or threshold temperature, the controller stops the operation thereof even when the vibration is detected. In one aspect, when the temperature of the heating film 31R, 31L increases and reaches a target or the reference or threshold temperature or when a predetermined time period lapses after the increase in temperature of the heating film 31R, 31L, the controller 34 stops heat generation of the heating film 31R, 31L to save energy.

The cover members 35R and 35L can be made of rubber or soft plastic materials. The cover members 35R and 35L can be formed to have slanted surfaces such that the cover members 35R and 35L can also serve as spoilers capable of preventing the wiper blade from being detached from the glass surface of the windshield even when the vehicle is driven at high speeds.

Each of the cover members 35R and 35L can include first fitting grooves 36 formed on opposite inner lower sides, such that the outer periphery of the frame 20 can be inserted into the first fitting grooves 36 to allow the frame 20 to be assembled to the right and left cover members 35R and 35L.

Although not shown in the drawings, each of the first fitting grooves 36 can be formed at one end thereof with a coupling maintenance protuberance (not shown) that can be inserted into the second depression 24 of the frame 20. Thus, coupling between the frame 20 and the right and left cover members 35R and 35L can be maintained by coupling between the second depressions 24 of the frame 20 and the coupling maintenance protuberances of the right and left cover members 35R and 35L.

The solar cell 37 is disposed on the outer surface of the cover member 35R, 35L, as described above, and, if needed, it is possible to adjust an installation area of the solar cell by changing the shape of the cover member or an installation location of the solar cell.

On the other hand, although eleven rectangular-shaped solar cells 37 are disposed on each of the cover members 35R and 35L in FIGS. 2 and 4, the size, quantity, and/or shape of the solar cell are not particularly limited to those shown in the figures, and the number of solar cells provided to each of the cover members 35R and 35L can be one or more. Moreover, although the solar cells 37 are not shown as being attached to the cover members 35R and 35L in FIG. 3, it can be desirable that the solar cells 37 be attached to the cover members 35R and 35L before the cover members 35R and 35L are provided to the frame 20 in practice.

The adapter 50 is configured to be disposed at the center of the frame such that the wiper blade can be coupled to a wiper arm (not shown). The present invention is not limited to the adapter shown in the drawings, and any kind of adapter can be applied to the wiper blade of embodiments of the present disclosure so long as the adapter can connect the wiper blade to wiper arms of various shapes. Additionally, it should be understood that the shapes of the wiper strip 10, frame 20, cover members 35R and 35L of the heating unit, heating films 31R and 31L, and the like are also given by way of illustration only, and do not limit the scope of the present invention.

As apparent from the above description, the present invention provides an advantageous effect in that the wiper blade can wipe a windshield in a suitable operating condition using a heating element included in the wiper blade even in a cold winter season.

Although the exemplary embodiments have been described with reference to the accompanying drawings, it should be noted that the present invention is not limited to the embodiments and the drawings, and that various modifications and changes can be made by those skilled in the art without departing from the spirit and scope of the present invention as defined by the accompanying claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A wiper blade configured to be coupled to a wiper arm of a vehicle to wipe a glass surface of a windshield, the wiper blade comprising:
    a wiper strip configured to contact the glass surface to wipe the glass surface when the wiper blade is coupled to the wiper arm;
    a frame coupled to the wiper strip; and
    a pair of heating units removably attached to the frame to selectively heat the wiper blade, wherein each of the heating units includes:
        a cover member having a fitting groove to engage the frame to removably attach the heating unit to an end of the frame;
        at least one solar cell disposed on a surface of the cover member;
        a battery chargeable by the solar cell and concealed by the cover member; and
        a heating element configured to be heated solely by power supplied from the heating unit itself.

2. The wiper blade of claim 1, further comprising:
    an adapter disposed at a center of the frame and configured to be joined to the wiper arm.

3. The wiper blade according to claim 1, wherein each of the pair of heating units operate independently.

4. The wiper blade according to claim 1, wherein the heating element includes a heating film formed by wrapping a NiCr or Kantal heating wire with a polyimide or polyethylene terephthalate (PET) film.

5. The wiper blade according to claim 1, wherein the cover member of each heating unit has a slanted surface to serve as a spoiler capable of preventing the wiper blade from being detached from the glass surface of the windshield when the wiper blade is couple to the wiper arm of the vehicle and the vehicle is driven at high speed.

6. The wiper blade according to claim 1, wherein the heating element of each heating unit is positioned to overlie an upper surface of the frame.

7. The wiper blade according to claim 1, wherein each heating unit further comprises:
    a temperature sensor to detect a temperature of the wiper blade; and
    a controller to operate the heating element of the heating unit based on the temperature detected by the temperature sensor.

8. The wiper blade according to claim 1, wherein each heating unit further comprises:
    a vibration sensor to detect vibration of the vehicle, on which the wiper blade is mounted; and
    a controller to operate the heating element based on the vibration detected by the vibration sensor.

9. The wiper blade according to claim 1, wherein the frame includes a depression at each end thereof and the cover member of each heating unit includes a coupling protuberance removably engaged with a respective one of the depressions of the frame.

10. A wiper blade heating unit configured to be coupled to a wiper blade having a frame and a wiper strip, the wiper blade heating unit comprising:
    a heating element heating the wiper blade;
    a cover member including a coupling feature to engage the frame of the wiper blade and being configured to conceal at least a portion of the heating element when the wiper blade heating unit is coupled to the wiper blade;
    a battery positioned within the cover member to supply power to the heating element; and
    a solar cell disposed on a surface of the cover member for generating electricity by exposure to sunlight to charge the battery, whereby the heating element is heated by power supplied from at least one of the battery and the solar cell of the wiper blade heating unit.

11. The wiper blade heating unit according to claim 10, wherein the cover member is shaped to act as a spoiler to assist the wiper blade to be brought into close contact with a glass surface of a vehicle when the wiper blade is coupled to a wiper arm of the vehicle and the vehicle travels.

12. The wiper blade heating unit according to claim 10, wherein the battery is a rechargeable battery.

13. The wiper blade heating unit according to claim 10, wherein the cover member includes a coupling protuberance at an end thereof to removably engage a corresponding depression of the frame when the wiper blade heating unit is coupled to the wiper blade.

14. A wiper blade comprising a frame, a wiper strip and a pair of wiper blade heating units each according to claim 10.

15. A wiper blade configured to be coupled to a wiper arm of a vehicle, the wiper blade comprising:
    a frame;
    a wiper strip coupled to the frame; and
    a pair of heating modules configured to heat the wiper blade, each heating module including a cover member having a frame coupling feature to secure the heating module to the frame of the wiper blade, at least one solar cell disposed on a surface of the cover member, a battery chargeable by the solar cell disposed within the cover member and a heating element to selectively heat the wiper blade, and each heating module attached directly to a respective one of opposing ends of the frame via the frame coupling feature of the cover member.

16. The wiper blade according to claim 15, wherein the frame includes a depression at each of the opposing ends thereof and the cover member of each heating module includes a coupling protuberance to removably engage a respective one of the depressions of the frame.

17. A wiper blade comprising:
    a frame having a first end and a second end;
    a wiper strip coupled to the frame;
    an adapter disposed at a center of the frame to join the wiper blade to a wiper arm of a vehicle;
    at least one heating element attached to the frame to selectively heat the wiper blade;
    a pair of cover members each having a frame coupling feature to secure each cover to a respective one of the first end and the second end of the frame with the adapter positioned therebetween;
    at least one solar cell disposed on a surface of each of the pair of cover members; and
    at least one battery chargeable by the solar cell disposed within each of the cover members.

* * * * *

UNITED STATES PATENT AND TRADEMARK OFFICE
CERTIFICATE OF CORRECTION

PATENT NO. : 8,327,496 B2  Page 1 of 1
APPLICATION NO. : 12/100005
DATED : December 11, 2012
INVENTOR(S) : In Kyu Kim It is certified that error appears in the above-identified patent and that said Letters Patent is hereby corrected as shown below:

IN THE CLAIMS

Column 7, Line 52:
"wiper blade is couple to the wiper arm of the vehicle and the" should read, --wiper blade is coupled to the wiper arm of the vehicle and the--.

Signed and Sealed this
Eighteenth Day of June, 2013

Teresa Stanek Rea
*Acting Director of the United States Patent and Trademark Office*